Aug. 13, 1929.  A. MURDOCH, JR  1,724,504
THERMOSTATICALLY CONTROLLED MIXING DEVICE
Filed Dec. 30, 1927  2 Sheets-Sheet 2

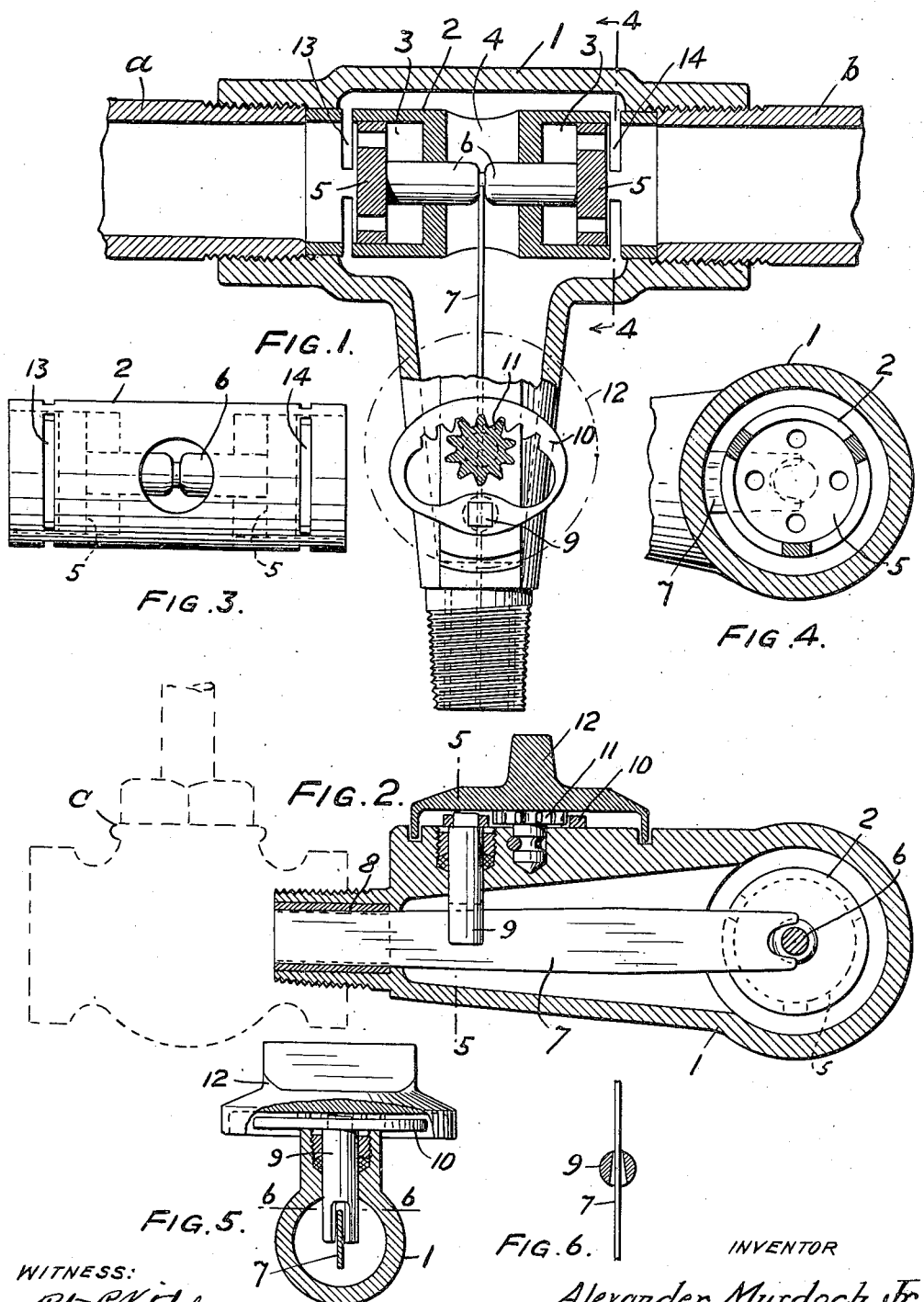

WITNESS:
Rob R Kitchel

INVENTOR
Alexander Murdoch, Jr.
BY
Augustus B. Houghton
ATTORNEY

Patented Aug. 13, 1929.

1,724,504

UNITED STATES PATENT OFFICE.

ALEXANDER MURDOCH, JR., OF PHILADELPHIA, PENNSYLVANIA.

THERMOSTATICALLY-CONTROLLED MIXING DEVICE.

Application filed December 30, 1927. Serial No. 243,634.

The principal object of the present invention is to provide a device of the character mentioned which shall be comparatively simple in construction, accurate and reliable in operation, and capable of ready adjustment.

Other objects of the invention will appear from the following description at the end of which the invention will be claimed.

The invention will be first described in connection with the accompanying drawing forming part hereof and in which Figure 1 is a view, principally in central section and with parts removed, of a mixing device illustrating one embodiment of the invention selected from other embodiments.

Fig. 2 is a transverse central section of the same.

Fig. 3 is a top or plan view of the interior portion of the device shown in Fig. 1.

Fig. 4 is a section taken on the line 4—4 of Fig. 1.

Fig. 5 is a sectional view taken on the line 5—5 of Fig. 2.

Fig. 6 is a sectional view taken on the line 6—6 of Fig. 5.

Figure 7:
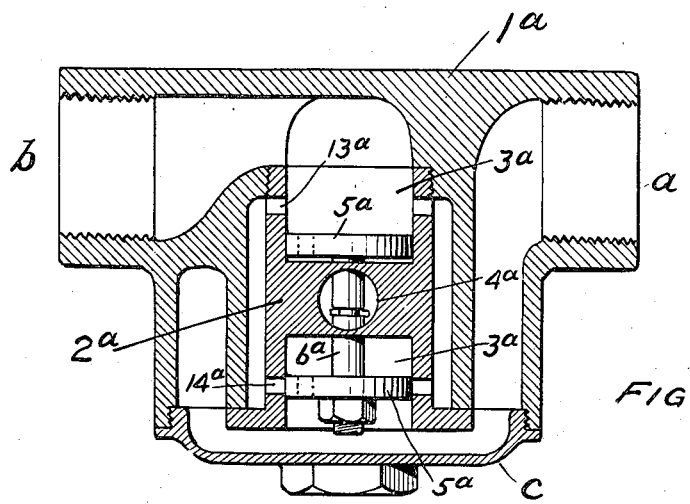
Fig. 7 is a section taken on the line 7—7 in Fig. 8 and it illustrates a modification.

Referring to the drawing and more particularly to Figs. 1 to 6, 1 is a tubular T fitting. 2 is a housing interposed between the arms of the T fitting and provided with spaced valve chambers 3 closed at one end and connected with the interior of the arms. The housing is ported as at 13 and 14 to the interior of the stem of the T fitting. 5 indicates perforated valves arranged in the chambers and having a stem 6 by which they are connected and which traverses the space 4 between the chambers. 7 is a thermostatic element mounted as at 8 in the stem of the T fitting and its free end is connected with the valve stem 6. There are means for setting or adjusting the thermostatic element 7, and they are shown to comprise a turnable spud 9 having a fork with V-shaped space between its prongs in which the thermostatic element 7 is arranged. The spud also carries the internal toothed rack element 10. This rack element is engaged by a pinion 11 carried by a turnable hand piece or knob 12.

In describing the mode of operation it will be assumed that the arms of the T fitting, or perhaps more accurately the valve chambers 3, are in communication with hot and cold water supply pipes $a$ and $b$ respectively and also that the arm of the T fitting is provided with a valve $c$ indicated by dotted lines in Fig. 2.

Through the intervention of the knob or hand piece 12 the fork in the spud 9 is so turned that the thermostat 7 is set and the U-shaped space in the fork permits this to be done without interfering with the freedom of the thermostatic element for subsequent action. When the valve $c$ is open, if the mixture of hot and cold water passing through the arm of the T fitting is not at the desired temperature, for example, if it is too hot, the thermostat shifts the valve 5, shown at the right hand in Fig. 1, toward the left, covering the port 13 and so restricting the supply of hot water passing from $a$ by way of 13 and 14. If the mixture is too cold, the thermostat operates in the opposite direction covering the port 14 and so reducing the supply of cold water. Inasmuch as the valves 5 are balanced by reason of the perforations and chambers 3, the thermostat is required to do very little work and therefore accurately shifts and positions the valves to produce a mixture of hot and cold water at substantially the temperature required. When the valve $c$ is closed the thermostatic element operates to limit the temperature of the water in the stem of the T fitting.

Figure 8:
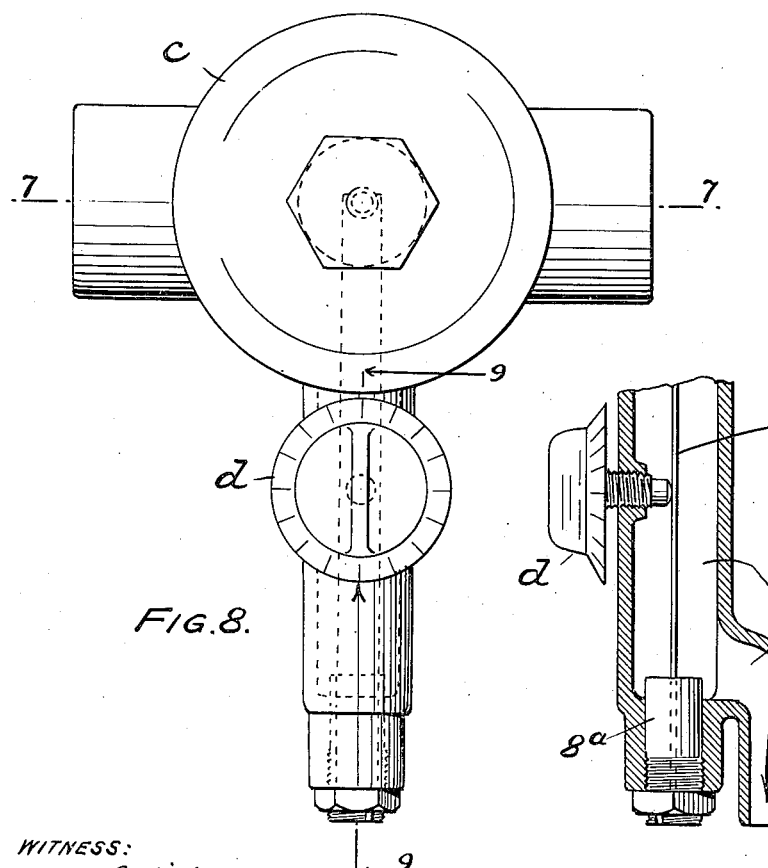
Fig. 8 is front elevation of a modification.
Figure 9:
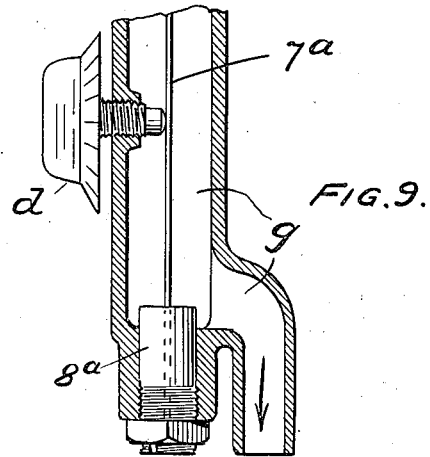
Fig. 9 is a section on the line 9—9 of Fig. 8.

The construction and mode of operation of the modification shown in Figs. 7 to 9 are as above described, except as follows and the corresponding parts are indicated by the same numbers with the exponent "a."

The housing $2^a$ and the parts carried thereby are arranged crosswise of the head of the fitting and are removable from and insertable into the fitting and for that purpose the cap $c$, may be removed. The thermostat $7^a$ and its mounting $8^a$ are removable through the end of the stem.

The thermostat is adjusted by the hand screw $d$. The hot water goes by $e$ and the cold water by $f$ to the fluid way $g$, in the stem of the fitting.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A thermostatically controlled mixing device comprising a tubular fitting of T shape having diverging arms and a stem, a housing removably interposed between the arms of the fitting and provided with spaced valve chambers closed at one end and respectively communicating with the interior of the arms of the fitting and ported to the interior of the fitting, perforated valves arranged in said chambers and having a valve stem by which they are connected and which traverses the space between the chambers, and a thermostatic element removably mounted in the stem of the fitting and having its free end connected with said valve stem.

2. A thermostatically controlled mixing device comprising a tubular fitting of T shape having diverging arms and a stem, a housing interposed between and crosswise of the arms of the fitting and provided with spaced valve chambers closed at one end and respectively communicating with the interior of the arms of the fitting and ported to the interior of the fitting, perforated valves arranged in said chambers and having a valve stem by which they are connected and which traverses the space between the chambers, a thermostatic element removably mounted in the stem of the fitting and having its free end connected with said valve stem, and a turnable hand screw penetrating the wall of the stem and adapted to press upon the thermostat.

ALEX. MURDOCK, Jr.